(12) United States Patent
Yoshida et al.

(10) Patent No.: US 12,111,282 B2
(45) Date of Patent: Oct. 8, 2024

(54) SOLID ELECTROLYTE AND GAS SENSOR WITH THERMAL SHOCK RESISTANCE

(71) Applicant: DENSO CORPORATION, Kariya (JP)

(72) Inventors: Mitsuhiro Yoshida, Kariya (JP); Satoshi Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 351 days.

(21) Appl. No.: 17/448,733

(22) Filed: Sep. 24, 2021

(65) Prior Publication Data
US 2022/0011259 A1 Jan. 13, 2022

Related U.S. Application Data

(63) Continuation of application No. PCT/JP2020/006214, filed on Feb. 18, 2020.

(30) Foreign Application Priority Data

Mar. 26, 2019 (JP) ................. 2019-059103

(51) Int. Cl.
*G01N 27/407* (2006.01)
*C04B 35/486* (2006.01)
(Continued)

(52) U.S. Cl.
CPC ....... *G01N 27/4073* (2013.01); *C04B 35/486* (2013.01); *C04B 2235/3225* (2013.01);
(Continued)

(58) Field of Classification Search
CPC .... C04B 2235/3225; C04B 2235/3246; C04B 2235/9607; C04B 35/486; G01M 15/102;
(Continued)

(56) References Cited

U.S. PATENT DOCUMENTS 4,328,296 A * 5/1982 Tanaka ................. C04B 35/486
429/304
4,344,904 A * 8/1982 Yamada ............. H01M 8/1253
264/235
(Continued)

FOREIGN PATENT DOCUMENTS

EP 0942279 A2 * 9/1999 ......... G01N 27/4073
JP 59-114455 7/1984
(Continued)

OTHER PUBLICATIONS

Mori et al., Improving the ionic conductivity of yttria-stabilised zirconia electrolyte materials, Elsevier Science B.V., Solid State Ionics 154-155 (2002) 529-533 (Year: 2002).*
(Continued)

*Primary Examiner* — David L Singer
(74) *Attorney, Agent, or Firm* — Nixon & Vanderhye P.C.

(57) ABSTRACT

A solid electrolyte includes stabilized or partially stabilized zirconia, and a gas sensor provided with the solid electrolyte. A change rate of a crystallite diameter for at least one of a cubic phase and a tetragonal phase in crystal particles constituting the solid electrolyte configured by a fired body after performing an annealing treatment, before and after heating the solid electrolyte from room temperature to 1200° C., is 10% or less. The solid electrolyte preferably includes partially stabilized zirconia.

4 Claims, 13 Drawing Sheets

(51) Int. Cl.
*G01M 15/10* (2006.01)
*G01N 27/409* (2006.01)

(52) U.S. Cl.
CPC .............. *C04B 2235/3246* (2013.01); *C04B 2235/9607* (2013.01); *G01M 15/102* (2013.01); *G01N 27/4071* (2013.01); *G01N 27/409* (2013.01)

(58) Field of Classification Search
CPC ........... G01N 27/4071; G01N 27/4073; G01N 27/409; H01B 1/06; Y02E 60/50
See application file for complete search history.

(56) References Cited

U.S. PATENT DOCUMENTS

| | | | | | |
|---|---|---|---|---|---|
| 4,370,393 | A | * | 1/1983 | Watanabe | G01N 27/4073 429/304 |
| 4,835,009 | A | * | 5/1989 | Ishiguro | H01M 4/9058 427/126.3 |
| 5,122,487 | A | * | 6/1992 | Hayakawa | G01N 27/4073 423/608 |
| 5,709,786 | A | | 1/1998 | Friese et al. | |
| 5,766,434 | A | * | 6/1998 | Fujii | G01N 27/4077 204/429 |
| 6,096,372 | A | * | 8/2000 | Nomura | G01N 27/4075 427/238 |
| 6,168,745 | B1 | * | 1/2001 | Jue | C04B 35/486 264/234 |
| 6,174,489 | B1 | * | 1/2001 | Kobayashi | G01N 27/4073 264/618 |
| 6,258,233 | B1 | * | 7/2001 | Sugiyama | G01N 27/4073 501/134 |
| 6,409,899 | B1 | * | 6/2002 | Satou | G01N 27/4077 204/429 |
| 6,660,145 | B2 | * | 12/2003 | Hotta | G01N 27/4077 204/429 |
| 2005/0118095 | A1 | | 6/2005 | Kim et al. | |
| 2006/0009344 | A1 | * | 1/2006 | Sone | C23C 28/3455 501/104 |
| 2009/0081101 | A1 | * | 3/2009 | Sugii | C01G 25/00 423/263 |
| 2010/0200427 | A1 | * | 8/2010 | Koike | C04B 35/4885 264/618 |
| 2014/0134329 | A1 | * | 5/2014 | Kawai | G01N 27/407 427/125 |
| 2015/0293051 | A1 | * | 10/2015 | Kajiyama | G01N 27/4075 204/424 |
| 2016/0293989 | A1 | * | 10/2016 | Ghyselen | H01M 8/124 |
| 2017/0301941 | A1 | * | 10/2017 | Echigo | H01M 8/02 |
| 2017/0349494 | A1 | | 12/2017 | Yamashita et al. | |
| 2019/0331634 | A1 | | 10/2019 | Yoshida et al. | |

FOREIGN PATENT DOCUMENTS

| | | | | |
|---|---|---|---|---|
| JP | 62-191466 | | 8/1987 | |
| JP | 63-210063 | | 8/1988 | |
| JP | H01261267 A | | 10/1989 | |
| JP | H09118568 A | | 5/1997 | |
| JP | H09147888 A | | 6/1997 | |
| JP | H11240755 A | * | 9/1999 | ............. C04B 35/48 |
| JP | 2018073801 A | | 5/2018 | |

OTHER PUBLICATIONS

Hattori et al., Effect of annealing on the electrical conductivity of the Y2O3—ZrO2 system, Elsevier B.V., Journal of Power Sources 131 (2004) 247-250 (Year: 2004).*
Moghadam et al., Influence of Annealing on the Electrical Conductivity of Polycrystalline ZrO2+8 Wt% Y2O3, Journal of the American Ceramic Society-Moghadam and Stevenson vol. 65, No. 4 (Year: 1982).*
Bae et al., Post-Annealing of Thin-Film Yttria Stabilized Zirconia Electrolytes for Anode-Supported Low-Temperature Solid Oxide Fuel Cells, American Scientific Publishers, Journal of Nanoscience and Nanotechnology vol. 14, 9294-9299, 2014 (Year: 2014).*
Hattori et al., Effect of aging on conductivity of yttria stabilized zirconia, Elsevier B.V., Journal of Power Sources 126 (2004) 23-27 (Year: 2004).*
Makoto Ito et al., "Development of a Highly Sensitive Oxygen Sensor", Denso Technical Review, vol. 17 2012, Denso Corporation, p. 30-34 (5 pages) w/ partial English translation (1 page).
Isao Sugiura et al., "Design of ceramic raw material powder", plasticity and processing (Journal of the Japan Society of Japan Plastic Processing), vol. 32, No. 368, Sep. 1991, Japan Society of Plastic Processing, p. 1090-1097 (8 pages) w/ partial English translation (5 pages).
"Dry Grinding", [online], Japan Coke Industry Coke Industry Co., Ltd. Processing Machine Division, [retrieved Jun. 15, Reiwa 5] (3 pages) w/ partial English translation (1 page).
International Search Report issued in PCT/JP2020/006214, dated Apr. 7, 2020, 2 pages.

* cited by examiner

SOLID ELECTROLYTE AND GAS SENSOR WITH THERMAL SHOCK RESISTANCE

CROSS-REFERENCE TO RELATED APPLICATION

The present application is a continuation application of International Application No. PCT/JP2020/006214 filed on Feb. 18, 2020, which is based on and claims the benefit of priority from Japanese Patent Application No. 2019-059103 filed Mar. 26, 2019. The contents of these applications are incorporated herein by reference in their entirety.

BACKGROUND

The present disclosure relates to a solid electrolyte including stabilized or partially stabilized zirconia, and a gas sensor provided with the solid electrolyte.

In an exhaust gas system of an internal combustion engine or the like, a gas sensor is used for a purpose of detecting an oxygen concentration, an air-fuel ratio, and the like in exhaust gas. In such a gas sensor, a solid electrolyte having oxide ion conductivity, such as zirconia, is used. The solid electrolyte is often used under an environment in which the temperature rapidly changes. However, since zirconia has the risk that cracks are caused by phase transition due to the temperature change, the thermal shock resistance is required to improve.

SUMMARY

An aspect of the present disclosure is a solid electrolyte including stabilized or partially stabilized zirconia, in which a change rate of a crystallite diameter for at least one of a cubic phase and a tetragonal phase in crystal particles constituting the solid electrolyte, before and after heating from room temperature to 1200° C., is 10% or less.

Another aspect of the present disclosure is a gas sensor provided with the solid electrolyte.

It is noted that parenthesized reference signs described in the claims indicate correspondence relations with specific measures described in the later-described embodiments, and do not limit the technical scope of the present disclosure.

BRIEF DESCRIPTION OF THE DRAWINGS

The above-described object and other objects as well as the characteristics and advantages of the present disclosure will be further clarified by the following detailed description with reference to the accompanying drawings. The drawings are as follows.

DETAILED DESCRIPTION OF THE PREFERRED EMBODIMENTS

As mentioned as above, since zirconia has the risk that cracks are caused by phase transition due to the temperature change, a solid electrolyte in a gas sensor is required to have the thermal shock resistance.

For example, JP 63-210063 A discloses a technology to improve thermal shock resistance by performing an aging treatment to form a monoclinic zirconia layer on a surface of a zirconia oxygen sensor element in which a stabilizing agent is in solid solution.

In recent years, however, a solid electrolyte has tended to be required to be used under a further higher load, and is required to have further enhanced thermal shock resistance.

Specifically, a solid electrolyte tends to be exposed to a further higher temperature environment due to, for example, the change of the mounting position of a vehicle-mounted gas sensor. Also, for example, in a hybrid vehicle and a stop/start vehicle, a solid electrolyte tends to be frequently exposed to a cold-hot cycle in association with the frequent stop and start of an engine and a heater.

The present disclosure is to provide a solid electrolyte and a gas sensor which are excellent in thermal shock resistance.

An aspect of the present disclosure is a solid electrolyte including stabilized or partially stabilized zirconia, in which a change rate of a crystallite diameter for at least one of a cubic phase and a tetragonal phase in crystal particles constituting the solid electrolyte, before and after heating from room temperature to 1200° C., is 10% or less.

Another aspect of the present disclosure is a gas sensor provided with the solid electrolyte.

In the solid electrolyte, the change rate of a crystallite diameter is adjusted to a prescribed value or less as described above. Therefore, strength reduction due to a cold-hot cycle is suppressed, and occurrence of racks is suppressed. As a result, the solid electrolyte is excellent in thermal shock resistance. For example, the solid electrolyte can maintain high strength even when exposed to a high temperature environment or an environment in which the frequency of a cold-hot cycle is high. It is considered that the reason is reduction of the strain caused by the relaxation of internal energy related to phase transition of a crystal phase. A mechanism thereof will be described later.

The gas sensor is provided with the solid electrolyte having excellent thermal shock resistance. Therefore, the gas sensor has high reliability against stress increase by a cold-hot cycle and can accurately measure a gas concentration for an extended period.

As described above, according to the above-described aspect, there can be provided a solid electrolyte and a gas sensor which are excellent in thermal shock resistance.

Embodiment 1

Figure 1:
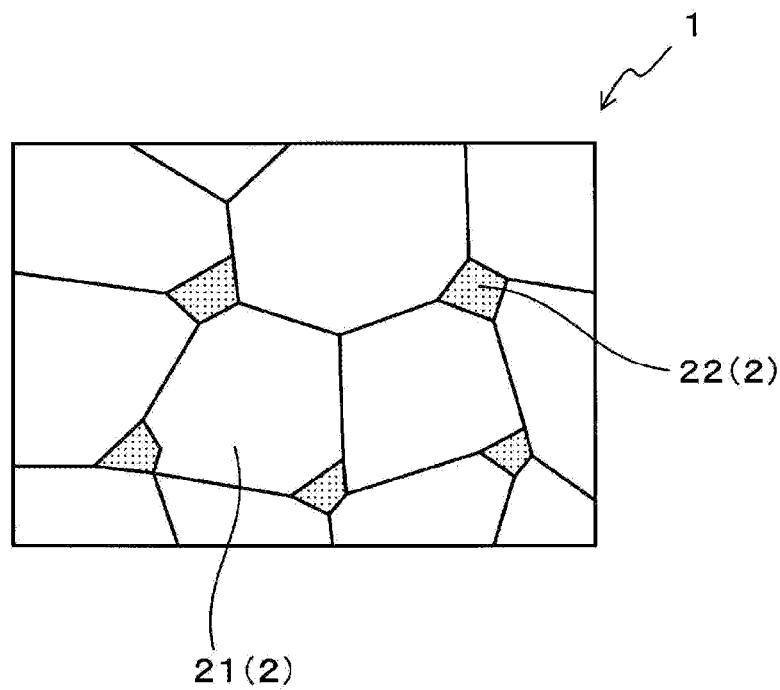
FIG. 1 is a schematic diagram showing a microstructure of a solid electrolyte in which strain is reduced, in Embodiment 1.

An embodiment of the solid electrolyte will be described with reference to FIG. 1 to FIG. 18. In the description below, a cubic phase is appropriately referred to as a "C phase"; a monoclinic phase is appropriately referred to as an "M phase"; and a tetragonal phase is appropriately referred to as a "T phase". As illustrated in FIG. 1, a solid electrolyte 1 is constituted by a large number of crystal particles 2. Forms of the crystal phase of the crystal particles 2 include a C phase 21, an M phase 22, and a T phase 23.

The solid electrolyte 1 includes stabilized zirconia or partially stabilized zirconia. Stabilized zirconia or partially stabilized zirconia is a so-called sintered body, in which a stabilizing agent forms a solid solution with zirconia.

Examples of a stabilizing agent include yttria, calcia, magnesia, scandia, and ytterbia. Stabilized zirconia or partially stabilized zirconia can contain at least one thereof as a stabilizing agent. From the viewpoint of enhancing chemical stability, the stabilizing agent is preferably yttria. When the stabilizing agent is yttria, partially stabilized zirconia is formed with an yttria content of 8 mol % or less, and stabilized zirconia is formed with an yttria content of more than 8 mol %.

In general, there are three types of crystal phases constituting the crystal particles 2 of zirconia ($ZrO_2$): the M phase 22, the T phase 23, and the C phase 21. As the temperature increases, phase transition in the order of the M phase 22, the T phase 23, and the C phase 21 occurs, and the phases are stabilized. When a stabilizing agent such as yttria is solid dissolved in zirconia, the C phase 21 and the T phase 23 are stabilized or semi-stabilized even at room temperature. Room temperature is, for example, 25° C., which also applies to the following description.

Figure 2:
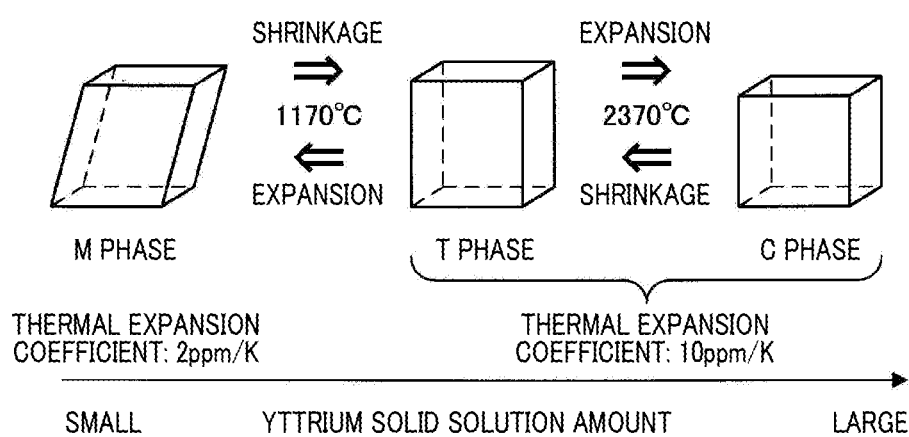
FIG. 2 is an illustrative diagram showing volume change of a crystal phase and a thermal expansion coefficient, in Embodiment 1.

Among the crystal phases, the C phase 21 is highest in ion conductivity, but low in strength and high in thermal expansion coefficient as shown in FIG. 2. From the viewpoint of lowering a thermal expansion coefficient, the solid electrolyte 1 is preferably constituted by a mixed phase of the C phase 21 and the M phase 22. In this case, a difference in thermal expansion coefficient between a different material member such as alumina and spinel ($MgAl_2O_4$) and the solid electrolyte 1 can be reduced. As a result, cracks or peeling caused by a difference in thermal expansion can be prevented from occurring at a contact part between the solid electrolyte 1 and a different material member.

Figure 3:
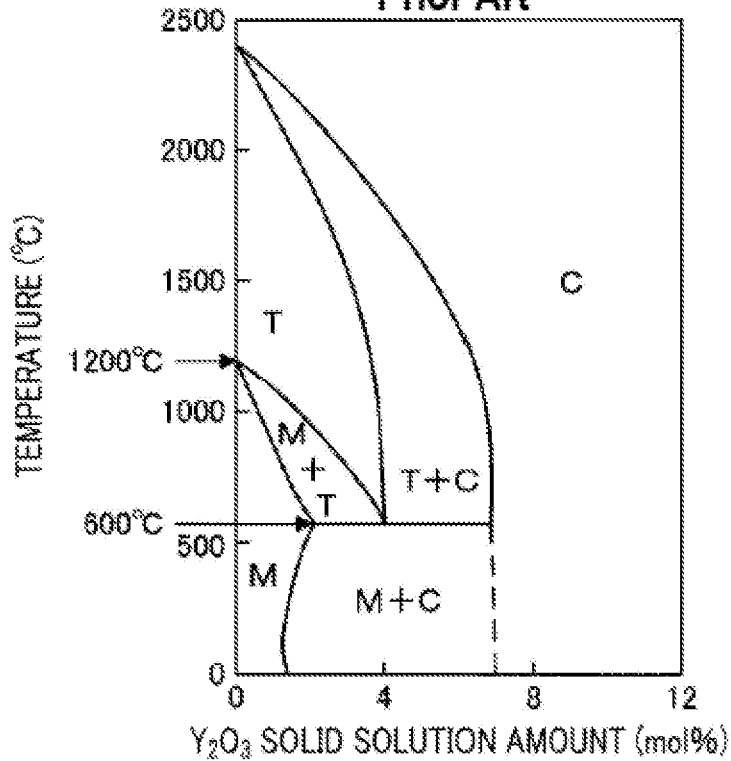
FIG. 3 is a $ZrO_2$—$Y_2O_3$ system phase diagram, in Embodiment 1.
Figure 4:
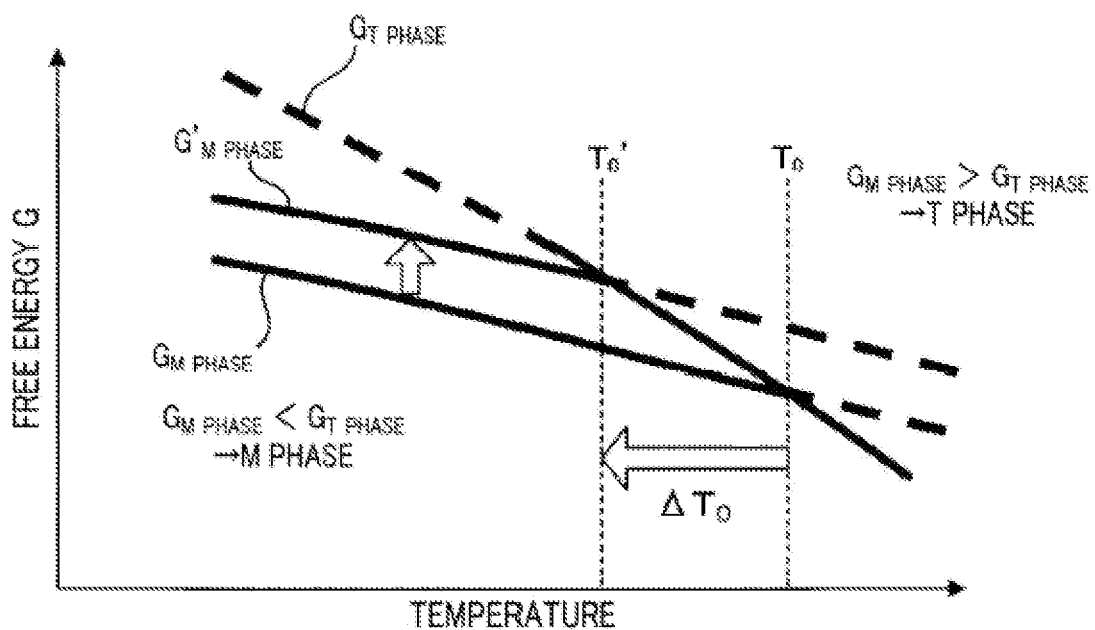
FIG. 4 is an illustrative diagram showing thermodynamic interpretation of phase transition of $ZrO_2$, in Embodiment 1.

As shown in FIG. 4, phase transition occurs when the internal energy of the crystal particles 2 is inclined to decrease for achieving a more stable state. In a solid-solution firing process of $ZrO_2$ and $Y_2O_3$, the crystal particles 2 of the M phase 22, which are in a stable state in a room temperature range, exist as the T phase 23 in a firing temperature range (specifically, 1400° C. or higher), as shown in FIG. 3. Then, while the temperature decreases after the completion of firing, phase transition from the T phase 23 to the M phase 22 occurs with expansion. The expansion is accumulated as strain near the grain boundary inside the crystal particles 2, without being released. Accordingly, the internal energy inside the crystal particles 2 becomes high. Therefore, the crystal particles 2 of the M phase 22 are likely to transition to the T phase 23. That is, the phase transition temperature from the M phase 22 to the T phase 23 is lower than the temperature defined in the phase diagram of FIG. 3. That is, the phase transition temperature decreases, as shown in FIG. 4, from $T_0$ to $T_0'$ by $\Delta T_0$.

It is effective to reduce strain and lower the internal energy of the crystal particles 2 for such phase transition peculiar to zirconia, which enables suppression of phase transition. For lowering the internal energy, an annealing treatment, for example, is effective. The reason is that thermal energy in an annealing treatment causes the crystal particles 2 to be rearranged by thermal vibration, and strain decreases. That is, the decrease of strain lowers the internal energy, with the result that a phase transition temperature increases, and phase transition is suppressed. The details will be described below.

Figure 5:
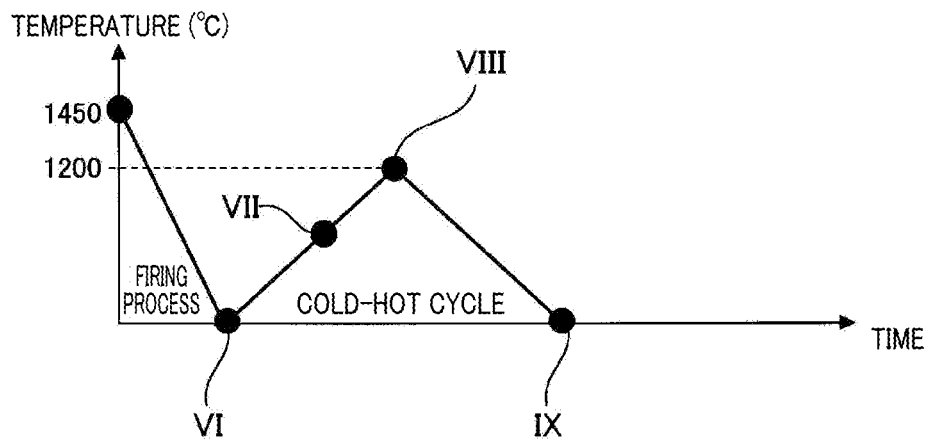
FIG. 5 is an illustrative diagram showing a temperature profile when a cold-hot cycle is performed after a firing step without performing an annealing treatment, in Embodiment 1.
Figure 6:
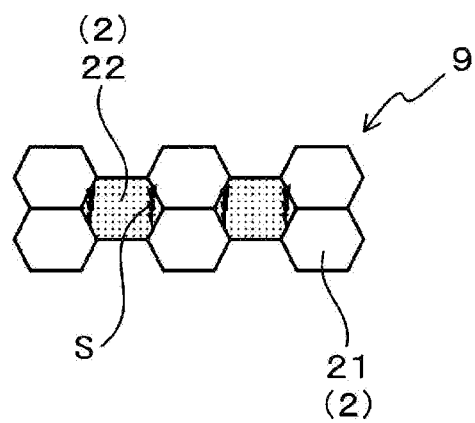
FIG. 6 is a schematic diagram showing a state of crystal phases constituting the solid electrolyte in VI of FIG. 5.
Figure 7:
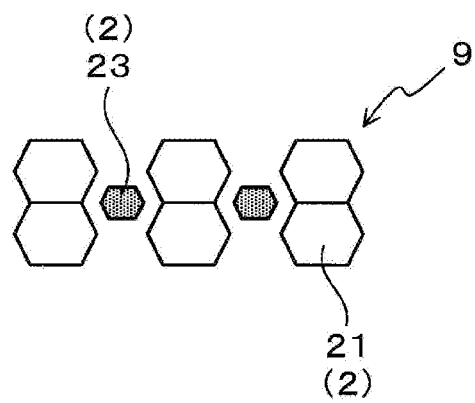
FIG. 7 is a schematic diagram showing a state of crystal phases constituting the solid electrolyte in VII of FIG. 5.
Figure 8:
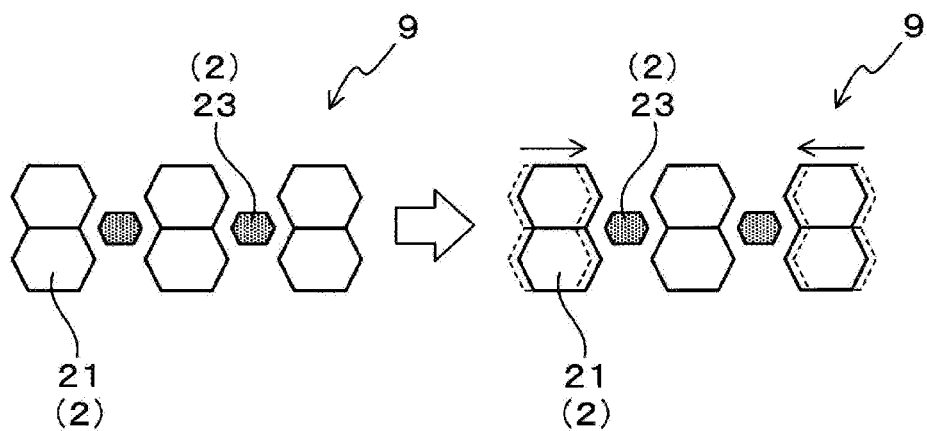
FIG. 8 is a schematic diagram showing a state of crystal phases constituting the solid electrolyte in VIII of FIG. 5.
Figure 9:
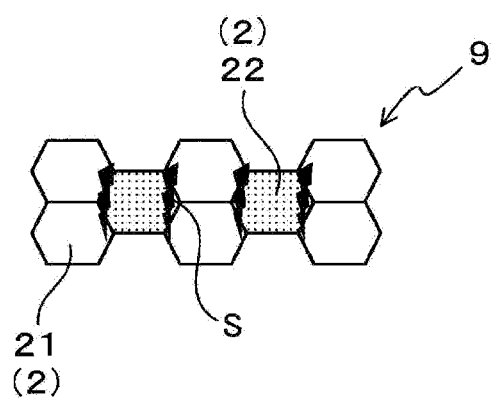
FIG. 9 is a schematic diagram showing a state of crystal phases constituting the solid electrolyte in IX of FIG. 5.
Figure 10:
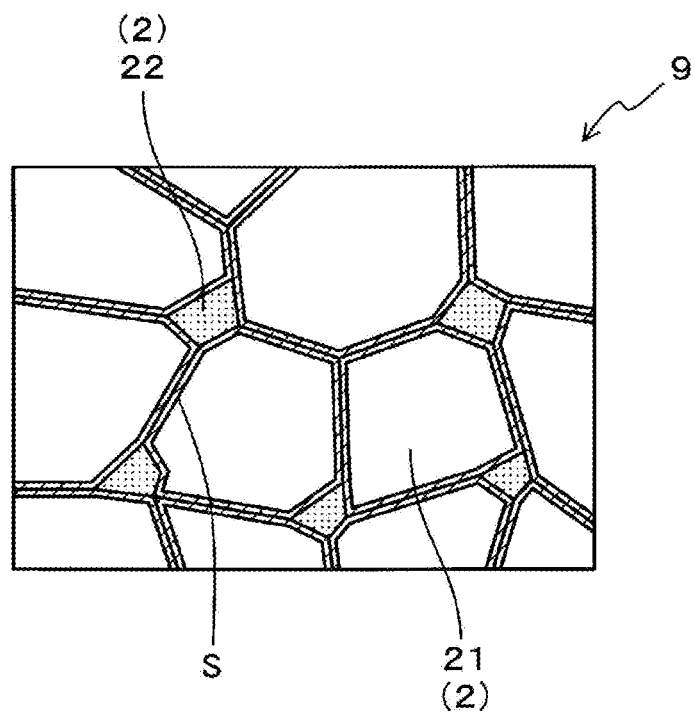
FIG. 10 is a schematic diagram showing a microstructure of a solid electrolyte having strain, in Embodiment 1.

When an annealing treatment, for example, is not performed after firing as shown in FIG. 5, a solid electrolyte 9 has strain S at, for example, the grain boundary of the crystal particles 2, as illustratively shown in FIG. 6, due to transition from the T phase 23 to the M phase 22 with expansion during temperature decrease in a firing step. The strain energy is transformed into internal energy. When a cold-hot cycle from room temperature to 1200° C. is imparted to such a solid electrolyte 9 as shown in FIG. 5, the M phase 22 of the crystal particles 2 transitions to the T phase 23 during temperature increase in a cold-hot cycle, and volume shrinkage occurs by, for example, about 4%, as illustrated in FIG. 6 and FIG. 7. When the temperature further increases after the occurrence of phase transition and reaches, for example, 1200° C. as shown in FIG. 5, the C phase 21 is subject to thermal expansion as shown in FIG. 8. At this time, gaps generated by the volume shrinkage in the phase transition from the M phase 22 to the T phase 23 are filled in by the thermal expansion of the C phase 21. As shown in FIG. 5, after cooling of a cold-hot cycle, the phase transition from the T phase 23 to the M phase 22 with expansion occurs, for example, in a room temperature state, as illustrated in FIG. 9. However, since the C phase 21 has also already expanded as described above, the strain S of the crystal particles 2 becomes larger than after firing. In brief, as illustrated in FIG. 10, the solid electrolyte 9 has strain at, for example, the grain boundary of the crystal particles 2, and the internal energy of the crystal particles 2 becomes larger than after firing.

Figure 11:
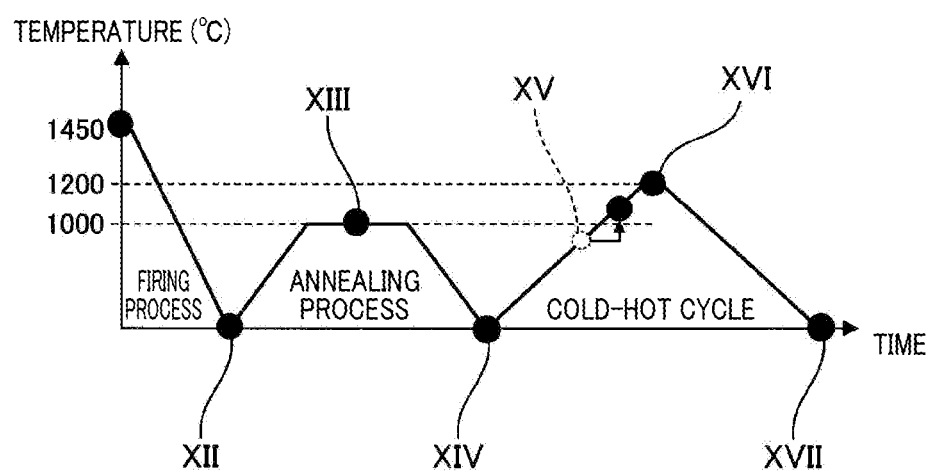
FIG. 11 is an illustrative diagram showing a temperature profile when an annealing treatment is performed after a firing step, and subsequently a cold-hot cycle is performed, in Embodiment 1.
Figure 12:
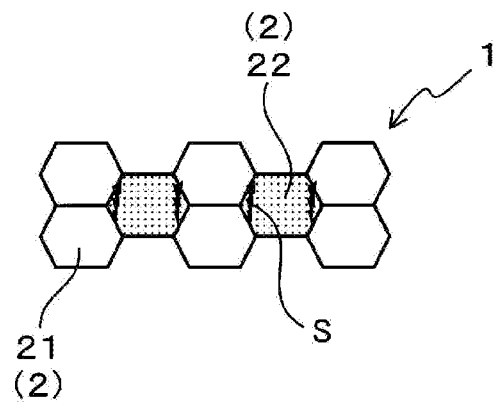
FIG. 12 is a schematic diagram showing a state of crystal phases constituting the solid electrolyte in XII of FIG. 11.
Figure 13:
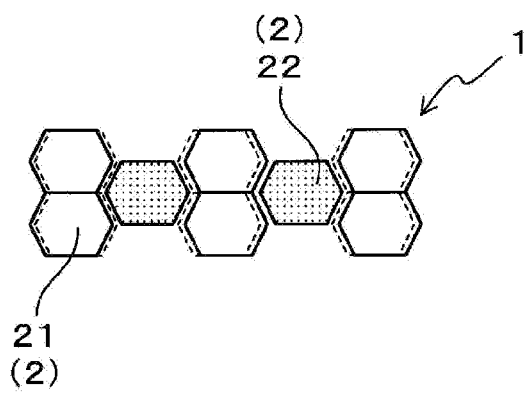
FIG. 13 is a schematic diagram showing a state of crystal phases constituting the solid electrolyte in XIII of FIG. 11.
Figure 14:
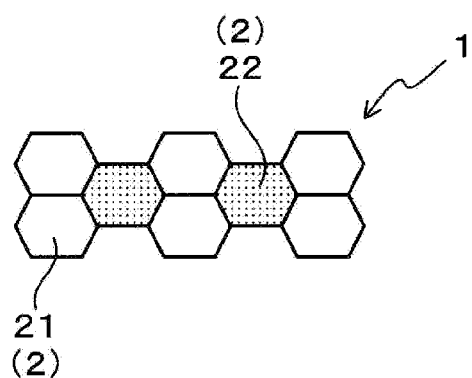
FIG. 14 is a schematic diagram showing a state of crystal phases constituting the solid electrolyte in XIV of FIG. 11.
Figure 15:
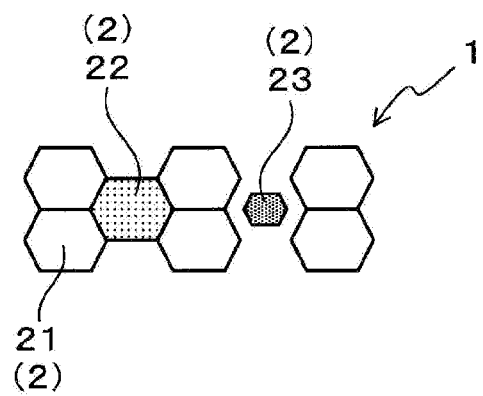
FIG. 15 is a schematic diagram showing a state of crystal phases constituting the solid electrolyte in XV of FIG. 11.
Figure 16:
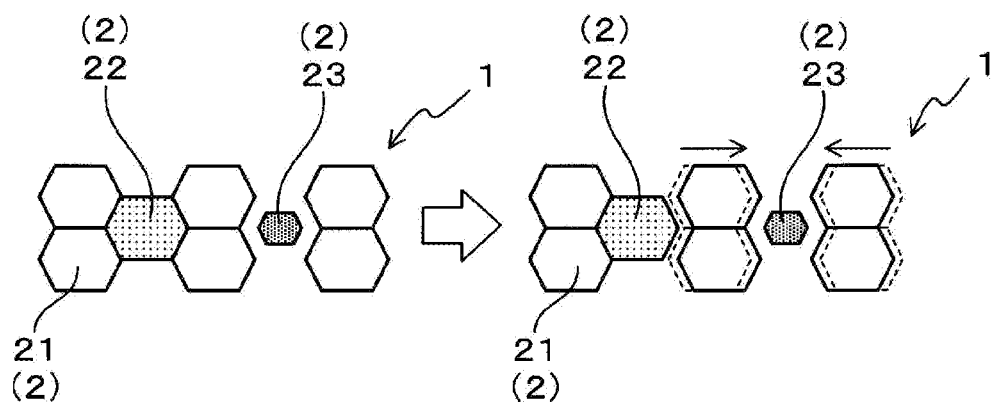
FIG. 16 is a schematic diagram showing a state of crystal phases constituting the solid electrolyte in XVI of FIG. 11.
Figure 17:
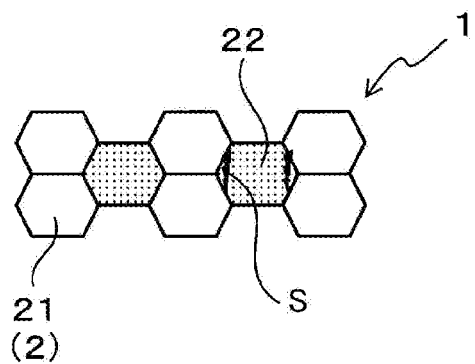
FIG. 17 is a schematic diagram showing a state of crystal phases constituting the solid electrolyte in XVII of FIG. 11.
Figure 18:
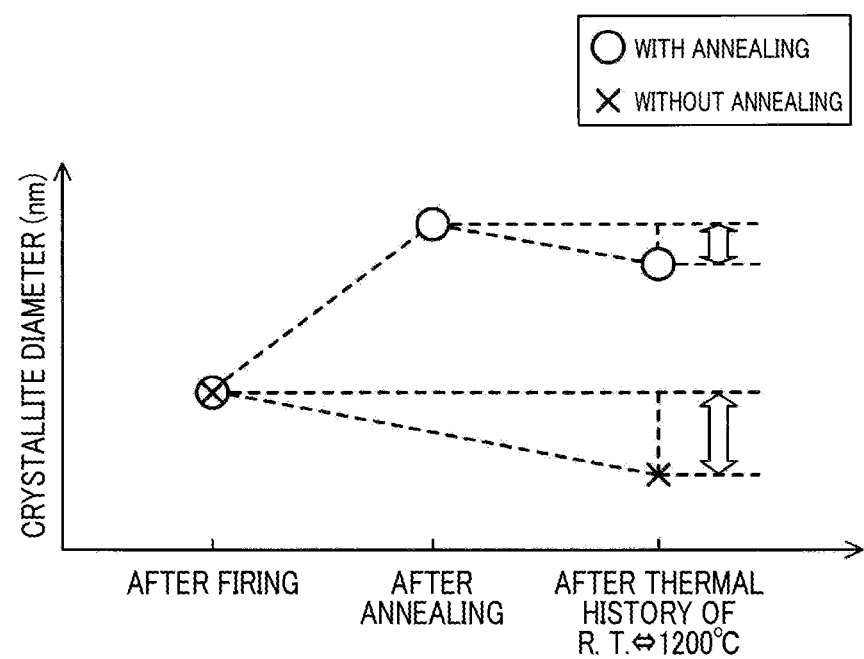
FIG. 18 is an illustrative diagram showing change of a crystallite diameter due to an annealing treatment, in Embodiment 1.

In contrast to this, when an annealing treatment, for example, is performed as shown in FIG. 11, the internal energy can be reduced by the following mechanism. As illustrated in FIG. 12, the crystal particles 2 of the solid electrolyte 1 have strain S due to the phase transition from the T phase 23 to the M phase 22 with expansion during temperature decrease in a firing step. When this solid electrolyte 1 is subjected to, for example, an annealing treatment as shown in FIG. 11, the crystal particles 2 are rearranged by thermal vibration as shown in FIG. 13, which causes the strain S to decrease. As a result, in the solid electrolyte 1, the internal energy of the crystal particles 2 becomes low after the annealing treatment, as illustrated in FIG. 14. As shown in FIG. 11 and FIG. 15, since the phase transition temperature from the M phase 22 to the T phase 23 increases in such a solid electrolyte 1, phase transition from the M phase 22 to the T phase 23 becomes unlikely during temperature increase when a cold-hot cycle from room temperature to 1200° C. is imparted to the solid electrolyte 1. Accordingly, gaps caused by volume shrinkage during phase transition becomes unlikely to occur. When the temperature further increases to reach, for example, 1200° C., the C phases 21 are subject to thermal expansion as illustrated in FIG. 16. However, since gaps generated by volume shrinkage are few, volume change of the C phases 21 filling in the gaps is unlikely to occur. In brief, when an annealing treatment is performed, influence by the thermal expansion of the C phases 21 decreases by an increase of the phase transition temperature from the M phase 22 to the T phase 23. As shown in FIG. 11, the transition from the T phase 23 to the M phase 22 with expansion occurs, for example, in a room temperature state, after cooling of the cold-hot cycle. However, since the influence by the thermal expansion of the C phases 21 is small (see FIG. 16), the strain S of the crystal particles 2 becomes small. In brief, in the solid electrolyte 1, the internal energy of the crystal particles 2 is small, as illustrated in FIG. 1 and FIG. 17.

The annealing temperature is, for example, not higher than the melting point of stabilized zirconia or partially stabilized zirconia. The annealing treatment is a concept which is different from removing the strains S by heating ceramics to the vicinity of the melting point for softening. Although the annealing temperature is preferably as high as possible, no effects are obtained if the phase transition from the M phase 22 to the T phase 23 occurs due to the annealing treatment, and the upper limit of the annealing temperature is 1200° C. based on the phase diagram shown in FIG. 3. Also, as indicated in FIG. 3, a mixed phase of the M phase 22 and the C phase 21 becomes stable in a room temperature range when the yttria concentration is 2.5 to 7 mol %. It is read that the upper limit of the annealing temperature in this mixed phase decreases to 600° C. as the yttria concentration increases. However, the phase diagram of FIG. 3 is a theoretical value in an equilibrium state. In practical stabilized zirconia and partially stabilized zirconia, yttria tends to have a statistical concentration distribution due to non-uniformity of a solid-solution reaction caused by variations in mixing raw material powder. In brief, in practice, the equilibrium state as shown in the phase diagram of FIG. 3 is unlikely to be achieved, and a temperature at which the phase transition from the M phase 22 to the T phase 23 occurs tends to be higher than the temperature of the theoretical value in FIG. 3. Therefore, the practical phase transition temperature becomes higher than 600° C., and the annealing temperature can be higher than 600° C. In practice, the annealing temperature is preferably 1150° C. or lower, more preferably 1100° C. or lower, and further preferably 1000° C. or lower.

As describe above, the larger the internal energy, the lower the phase transition temperature, and the larger the strain S occurring in the cold-hot cycle. Therefore, the strain S in the cold-hot cycle serves as an alternative index for internal energy. Specifically, the strain S may be evaluated before and after the solid electrolyte 1 has been heated from room temperature to 1200° C., more specifically by imparting a cold-hot cycle of room temperature→1200° C.→room temperature to the solid electrolyte 1. The strain S can be understood as an atomic distance in a crystal. Therefore, the strain S can be evaluated by measuring and calculating a crystallite diameter by X-ray diffraction (XRD). When the change rate of a crystallite diameter before and after the cold-hot cycle is larger, it indicates that the internal energy is larger. Although a method for measuring and calculating a crystallite diameter will be described in Experimental Examples, the crystallite diameter is calculated based on a half width and a diffraction angle in an XRD pattern according to the Scherrer equation.

Although only the M phase 22 expands due to phase transition, evaluation on a crystallite diameter may be performed for any of the C phase 21, the M phase 22, and the T phase 23, from the viewpoint of a balance of forces caused by the crystal particles 2 around the M phase 22 pushing each other in association with expansion. On the other hand, occurrence of minute cracks causes strength reduction of the solid electrolyte 1, and minute cracks caused by the strain S occur inside the crystal particles 2 of the C phase 21 and near the C phase 21 whose strength is smaller than the M phase 22 and the T phase 23. Therefore, the crystallite diameter of the C phase 21 is preferably evaluated. The strength of the C phase 21 decreases for the reasons that a crystal is likely to be cleaved due to a large lattice symmetry, the reactivity is increased by the solid solution of $Y_2O_3$, and the particle diameter increases during sintering.

The C phase 21 and the T phase 23 have a similar crystal structure, and can be distinguished by a miller index on the high angle side in an XRD evaluation. However, the peak intensity is weak, and measurement accuracy decreases. Therefore, from the viewpoint of easily measuring and calculating a crystallite diameter by XRD, the change rate of a crystallite diameter is preferably evaluated for at least one of the C phase 21 and the T phase 23. In XRD, a crystallite diameter can be measured and calculated based on peaks attributable to the {111} surface of the C phase 21 and the {101} surface of the T phase 23 where the peak intensity becomes largest.

In the solid electrolyte 1 according to the present embodiment, a change rate of a crystallite diameter for at least one of a C phase and a T phase in crystal particles constituting the solid electrolyte 1, when the solid electrolyte 1 is heated from room temperature to 1200° C., is 10% or less. When the change rate of a crystallite diameter exceeds 10%, strain energy is large, which causes thermal shock resistance to become insufficient. From the viewpoint of further enhancing thermal shock resistance, the change rate of a crystallite diameter is preferably 6% or less and more preferably 2% or less.

As shown in FIG. 17, the crystals of the solid electrolyte 1 are stabilized by, for example, an annealing treatment, and the crystallite diameter becomes large. Furthermore, compared to when an annealing treatment is not performed, the change rate of a crystallite diameter after a thermal history by the cold-hot cycle of the solid electrolyte 1 decreases. It is noted that in the present embodiment, the solid electrolyte 1, in which the internal energy is reduced by an annealing treatment to lower the change rate of a crystallite diameter, has been described. However, the solid electrolyte 1 exhibits excellent thermal shock strength even by a method other than the annealing treatment, as long as the change rate of a crystallite diameter is 10% or less.

The solid electrolyte 1 is suitable for, for example, a gas sensor that detects exhaust gas of a vehicle. The reason is as follows. In a use environment of a gas sensor, an exhaust gas temperature is expected to increase, because the start-stop cycle of an engine will further increase, and the thermal efficiency of an engine will improve. In brief, a load of an engine increases, and an exhaust gas temperature increases. As a result, in a solid electrolyte of a gas sensor, the phase transition temperature from the M phase 22 to the T phase 23 is reached as described above, and phase transition from the T phase 23 to the M phase 22 occurs again during cooling. The strain S caused in association with the shrinkage and expansion at this time may cause minute cracks to develop, and strength may decrease. However, in the solid electrolyte 1 in which the change rate of a crystallite diameter under the above-described prescribed conditions is 10% or less, the phase transition temperature of the M phase 22 can be increased by, for example, 60° C. at the maximum. Therefore, the strength is unlikely to decrease even if the exhaust gas temperature increases in the future.

It is preferable that the solid electrolyte 1 include partially stabilized zirconia, and the yttria content of the partially stabilized zirconia be 2 to 8 mol %. In this case, a difference in thermal expansion coefficient between a different material member such as alumina and spinel ($MgAl_2O_4$) and the solid electrolyte 1 can be reduced. As a result, occurrence of cracks caused by a difference in thermal expansion coefficient can be prevented. Therefore, the solid electrolyte 1 is suitable for an application to bond with a different material member. An example of such an application is a sensor element of a gas sensor. It is preferable that the yttria content of the partially stabilized zirconia be 4.5 to 8 mol %. In this case, the thermal expansion coefficients of the different material member and the solid electrolyte 1 further conform to each other, and the occurrence of cracks can be further prevented.

The solid electrolyte 1 is produced by performing a mixing step, a firing step, and an annealing step. In the mixing step, zirconia and a stabilizing agent are mixed. Accordingly, a mixture is obtained. The mixture can be molded into a desired shape to obtain a molded body.

In the firing step, the mixture or the molded body thereof is fired to obtain a fired body. This fired body includes stabilized zirconia or partially stabilized zirconia.

In an annealing step, the fired body is heated. The annealing temperature is, for example, 800 to 1150° C. When the annealing temperature is lower than 800° C., the internal energy of the crystal particles 2 cannot be sufficiently reduced. On the other hand, when it exceeds 1150° C., the phase transition from the M phase 22 to the T phase 23 occurs during the annealing treatment, and the effect of lowering the internal energy cannot be obtained. From the viewpoint of sufficiently obtaining the effect of lowering the internal energy by the annealing treatment, the annealing temperature is preferably 900 to 1100° C. and more preferably 950 to 1000° C. A specific example of the production method of the solid electrolyte 1 will be described in the Experimental Examples.

Embodiment 2

An embodiment related to a gas sensor will be described. It is noted that the reference signs used in Embodiment 2 and thereafter, which are the same as those used in the previous embodiment, denote the same constituents and the like as those in the previous embodiment, unless otherwise indicated.

Figure 19:
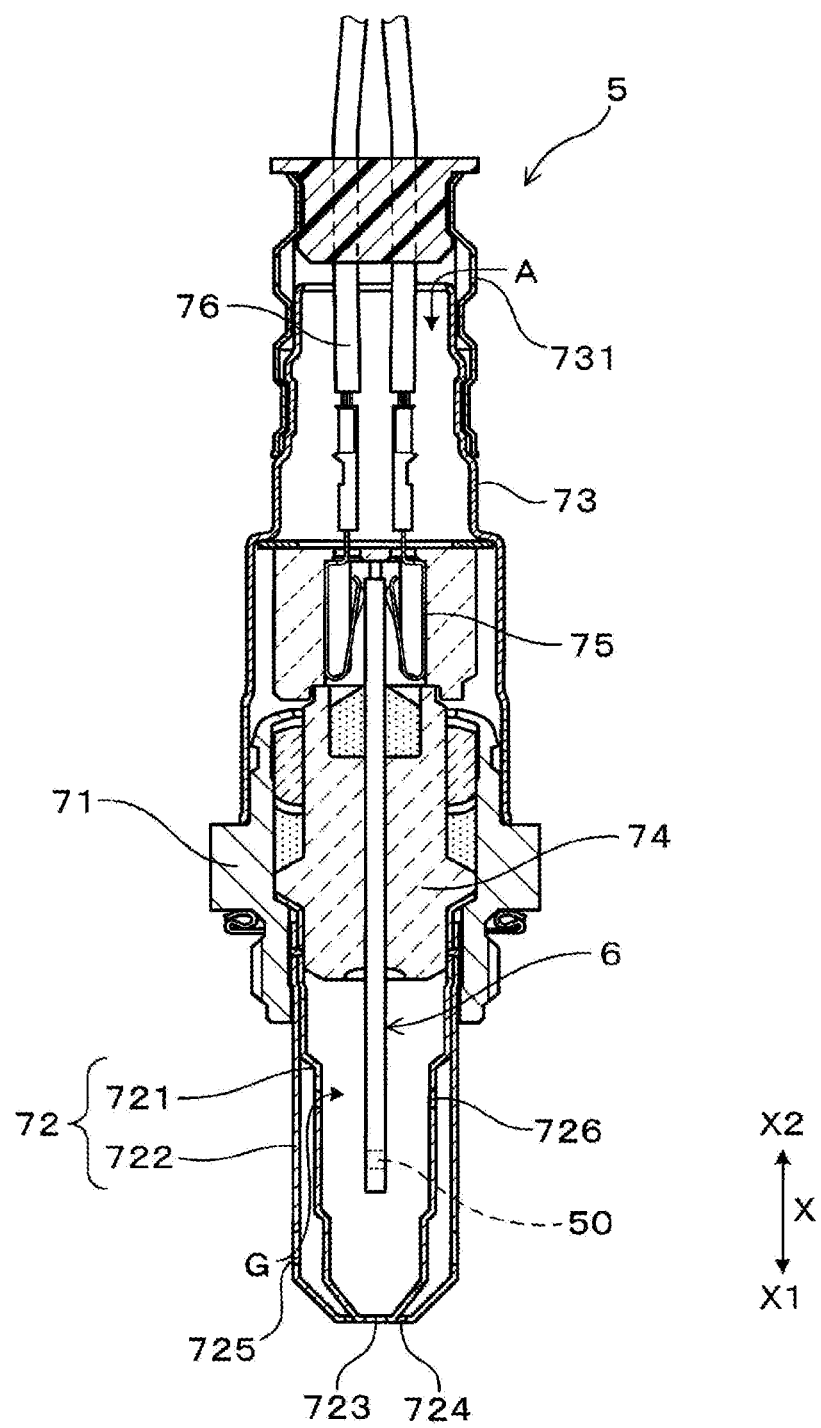
FIG. 19 is a cross-sectional diagram of a gas sensor, in Embodiment 2.
Figure 20:
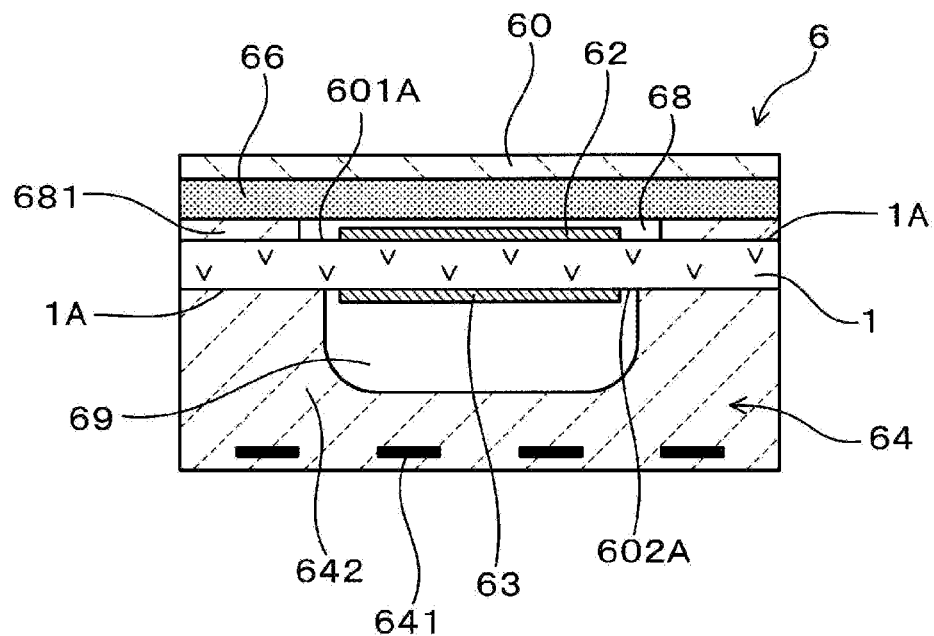
FIG. 20 is a cross-sectional diagram of a laminated-type gas sensor element, in Embodiment 2.

A gas sensor 5 according to the present embodiment includes a sensor element 6 as shown in FIG. 19 and FIG. 20. The sensor element 6 according to the present embodiment is a gas sensor element that detects gas. The sensor element 6 has the solid electrolyte 1, a detection electrode 62, a reference electrode 63, and a diffusion resistance layer 66. In brief, the gas sensor 5 includes the solid electrolyte 1 in the sensor element 6. The detection electrode 62 and the reference electrode 63 are formed on both surfaces 601A and 602A of the solid electrolyte 1, respectively. The detection electrode 62 and the reference electrode 63 form a pair of electrodes which are formed in positions facing each other. The diffusion resistance layer 66 limits the flow rate of measurement gas, such as exhaust gas G, which reaches the detection electrode 62. The gas sensor 5 is of a limiting current system which detects an oxygen concentration (that is, an air-fuel ratio) of exhaust gas G by the magnitude of a limiting current produced between the pair of electrodes 62 and 63 while voltage is applied between the electrodes 62 and 63.

Hereinafter, the gas sensor 5 according to the present embodiment will be described in detail. It is noted that in the following description, a tip side X1 is a side exposed to measurement gas such as exhaust gas G in an axial direction X of the gas sensor 5, and a base side X2 is the opposite side.

(Gas Sensor)

In use, the gas sensor 5 is disposed to an exhaust pipe of an internal combustion engine of a vehicle or the like. The gas sensor 5 of a limiting current system as in the present embodiment is used as an air-fuel ratio sensor that quantitatively detects an air-fuel ratio of exhaust gas G flowing through the exhaust pipe. This gas sensor 5 can quantitatively calculate an air-fuel ratio both when the air-fuel ratio of exhaust gas G is on a rich side and when it is on a lean side.

Here, an air-fuel ratio of exhaust gas G refers to a mixed ratio between fuel and air which have been burned in an internal combustion engine. Also, a rich side refers to a side on which fuel is more in an air-fuel ratio of exhaust gas G, compared to in the theoretical air-fuel ratio when fuel and air are completely burned. The lean side refers to a side on which fuel is less in an air-fuel ratio of exhaust gas G, compared to in the theoretical air-fuel ratio.

In the gas sensor 5 according to the present embodiment, an air-fuel ratio of exhaust gas can be detected by detecting an oxygen concentration of exhaust gas. The gas sensor 5 as an air-fuel ratio sensor which substantially detects an oxygen concentration of exhaust gas G on a lean side, while detecting an unburned gas concentration of exhaust gas G on a rich side.

As shown in FIG. 19, the gas sensor 5 has, other than the sensor element 6, a housing 71, a tip-side cover 72, a base-side cover 73, and the like. The housing 71 is mounted to the exhaust pipe to hold the sensor element 6 through an insulator 74. The tip-side cover 72 is disposed on the tip side X1 of the housing 71 to cover the sensor element 6. The tip-side cover 72 has a double structure and includes an inner cover 721 and an outer cover 722. The base-side cover 73 is disposed on the base side X2 of the housing 71 to cover, for examples, a terminal 75 for electrical wiring of the sensor element 6.

(Sensor Element)

As illustrated in FIG. 20, a laminated-type sensor element, for example, is used as the sensor element 6. In brief, the sensor element 6 can be constituted by a laminated body in which the reference electrode 63, the plate-like solid electrolyte 1, and the detection electrode 62 are sequentially laminated.

As illustrated in FIG. 20, the sensor element 6 includes, for example, the plate-like solid electrolyte 1. The solid electrolyte 1 has a measurement gas surface 601A and a reference gas surface 602A. The measurement gas surface 601A is a surface to be exposed to measurement gas such as exhaust gas G and serves as a gas contact portion to contact measurement gas. On the other hand, the reference gas surface 602A is a surface to be exposed to reference gas such as the atmosphere A. The measurement gas surface 601A and the reference gas surface 602A are surfaces opposite each other in the solid electrolyte 1.

The detection electrode 62 is disposed on the measurement gas surface 601A of the solid electrolyte 1. On the other hand, the reference electrode 63 is disposed on the reference gas surface 602A. In the sensor element 6 constituted by such a laminated-type sensor element, a heating element 641 constituting a heater 64 is laminated on the solid electrolyte 1 through an insulating material 642. The insulating material 642 contains, for example, alumina.

The detection electrode 62 faces a measurement gas chamber 68. Into the measurement gas chamber 68, measurement gas is to be introduced through the porous diffusion resistance layer 66. The measurement gas chamber 68 is a space surrounded by the solid electrolyte 1, a measurement gas chamber forming layer 681, and the diffusion resistance layer 66. The detection electrode 62 is in contact with the solid electrolyte 1. Furthermore, the measurement gas chamber forming layer 681, which is a structural member of the measurement gas chamber 68, is in contact with the solid electrolyte 1. The detection electrode 62 is a site where it is exposed to measurement gas such as exhaust gas G and detects gas together with the reference electrode 63. The detection electrode 62 is electrically connected to the terminal 75 to which a lead wire 76 is connected.

The reference electrode 63 faces a reference gas chamber 69. Into the reference gas chamber 69, reference gas such as the atmosphere A is to be introduced from the base side X2 through a through hole 731 of the base-side cover 73. It is noted that as the sensor element 6, the later-described cup-type sensor element can also be used in place of the laminated-type sensor element.

The detection electrode 62 is exposed to measurement gas such as exhaust gas G which flows into the tip-side cover 42 via through holes 723, 724, and 725 disposed to the tip-side cover 72. The reference electrode 63 is to be exposed to reference gas such as the atmosphere A which flows into the reference gas chamber 69 of the solid electrolyte 1 from the inside of the base-side cover 73 via the through hole 731 disposed to the base-side cover 73.

The heater 64 generates heat by energization and heats the solid electrolyte 1 and the electrodes 62 and 63 to the activating temperature during, for example, the start-up of an internal combustion engine and the gas sensor 5. The heater 64 includes the insulating material 642 constituted by an alumina sintered body and the heating element 641 formed inside the insulating material 642. The alumina sintered body constituting the insulating material 642 is in contact with the solid electrolyte. The insulating material 642 constituting the heater 64 is also a structural member forming the reference gas chamber 69 and also serves as a reference gas chamber forming layer.

Also, the measurement gas chamber forming layer 681 constituting the measurement gas chamber 68 is laminated on the measurement gas surface 601A side of the solid electrolyte 1. The measurement gas chamber forming layer 681 contains alumina. In brief, the solid electrolyte 1 is in contact with the insulating material 642 constituting the heater 64 on the reference gas surface 602A side and the measurement gas chamber forming layer 681 on the measurement gas surface 601A side. In brief, the solid electrolyte 1 has contact portions 1A with the measurement gas chamber forming layer 681 and the insulating material 642 both being a different material member.

The diffusion resistance layer 66 contains, for example, a porous body of spinel. Also, a shielding layer 60 containing alumina is disposed on a surface of the diffusion resistance layer 66. This shielding layer 60 is constituted by a dense body that does not transmit gas. The exhaust gas G having flowed into the tip-side cover 72 passes through the diffusion resistance layer 66 and reaches a measuring portion 50 of the detection electrode 62. In the configuration of the sensor element 6 illustrated in FIG. 20, the diffusion resistance layer 66 is not in contact with the solid electrolyte 1. However, a configuration in which the diffusion resistance layer 66 is in contact with the solid electrolyte 1 can also be adopted.

(Solid Electrolyte)

The solid electrolyte 1 includes stabilized zirconia or partially stabilized zirconia. Specifically, the solid electrolyte 1 according to Embodiment 1 is used. This solid electrolyte 1 is excellent in thermal shock resistance. For example, the solid electrolyte 1 can maintain high strength even to a cold-hot cycle in which it is exposed to a high temperature range of, for example, higher than 1050° C. Therefore, even when the gas sensor 5 is used in an environment at, for example, higher than 1050° C., the gas sensor 5 can detect measurement gas while maintaining high reliability. Also, strength reduction of the solid electrolyte is suppressed even in an environment in which a cold-hot cycle is repeated many times. Therefore, even when the gas sensor is used in an environment in which the frequency of heating and cooling is high, the gas sensor can detect measurement gas while maintaining high reliability.

(Electrode)

The material of the detection electrode 62 according to the present embodiment is not particularly limited, as long as it has catalytic activity to oxygen or the like. For example, the detection electrode 62 can contain, as a noble metal ingredient, any compositions of Pt (platinum), Au (gold), Ag (silver), a mixture of alloy of Pd (palladium) and Ag, and a mixture or alloy of Pt and Au. Also, the material of the reference electrode 63 is not particularly limited. The reference electrode 63 can contain, as a noble metal ingredient, Pt, Au, Ag, Pd, and the like.

Figure 21:
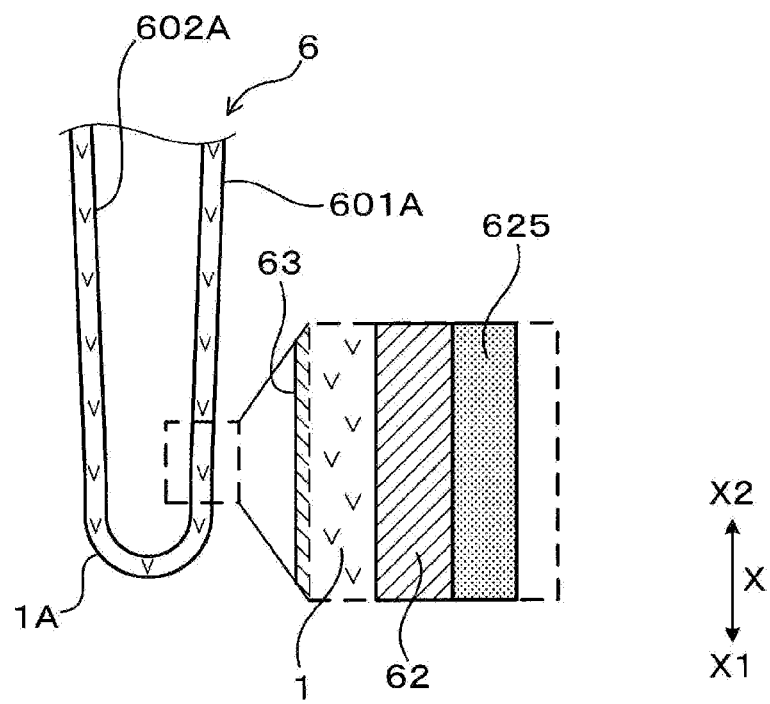
FIG. 21 is a cross-sectional diagram of a cup-type gas sensor element, in Embodiment 2.

Also, as illustrated in FIG. 21, a bottomed cylindrical type (specifically, cup-type) sensor element, for example, can also be used as the sensor element 6, in place of the laminated-type sensor element. Such a cup-type sensor element includes the solid electrolyte 1 having a bottomed cylindrical shape (specifically, a cup shape), the detection electrode 62, and the reference electrode 63. The detection electrode 62 is disposed on an outer circumferential surface 601A of the solid electrolyte 1. The reference electrode 63 is disposed on an inner circumferential surface 602A of the solid electrolyte 1. In such a cup-type sensor element, unshown rod-like heater is inserted into the sensor element 6. The heater heats the sensor element 6 to a desired temperature.

The detection electrode 62 is disposed on the outer circumferential surface 601A of the solid electrolyte 1. Furthermore, a porous protective layer 625 is formed on the outer circumferential surface 601A of the solid electrolyte. In FIG. 21, the protective layer 625 is a porous body and contains, for example, spinel. It is noted that in the example shown in FIG. 21, the detection electrode 62 exists between the protective layer 625 and the solid electrolyte 1. However, the detection electrode 62 is not necessarily formed on the entirety of the outer circumferential surface 601A, and an unformed portion usually exists. Therefore, although not shown, a portion where the protective layer 625 and the solid electrolyte 1 are in contact with each other exists. In brief, the solid electrolyte 1 has a contact portion 1A with the protective layer 625 which is a different material member. The outer circumferential surface 601 at the tip side X1 of the solid electrolyte 1 becomes a contact portion to contact measurement gas such as exhaust gas G.

The reference electrode 63 is disposed on the inner circumferential surface of the cup-type solid electrolyte 1. It is noted that the reference electrode 63 may also be disposed on the entirety or a part of the inner circumferential surface. When disposed on a part of the inner circumferential surface, alumina constituting the heater and the solid electrolyte contact each other in some cases.

Similarly to in the case of the above-described laminated-type sensor element, strength to a cold-hot cycle can also be improved in the cup-type sensor element, by using the solid electrolyte 1 in Embodiment 1. Therefore, even in the gas sensor 5 including the cup-type sensor element, the gas sensor 5 can detect measurement gas while maintaining high reliability.

Experimental Example 1

Figure 22:
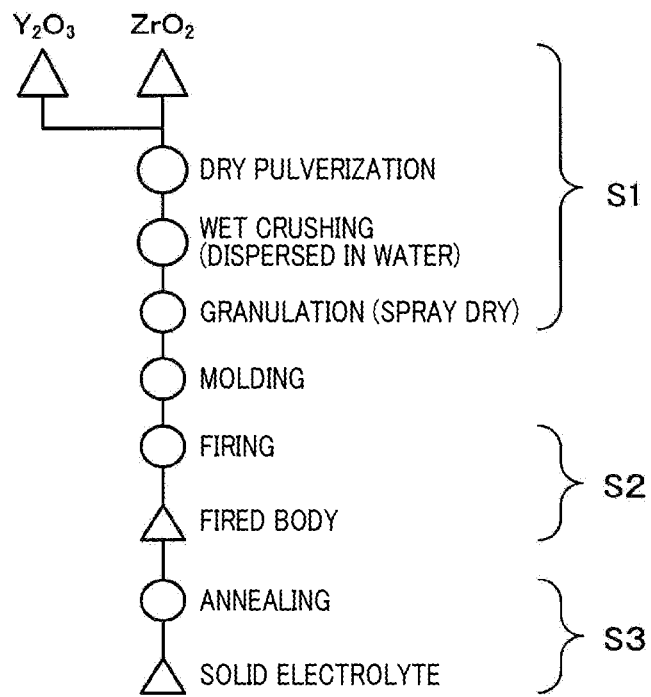
FIG. 22 is an illustrative diagram showing a production method of a solid electrolyte, in Experimental Example 1.

A plurality of solid electrolytes is prepared, and the performances thereof are compared and evaluated. Hereinafter, a preparation method of a solid electrolyte in this example will be described. In the production of a solid electrolyte, at least mixing step S1, firing step S2, and annealing step S3 are performed, as illustrated in FIG. 22. In this example, a molding step is performed after the mixing step and before the firing step.

As illustrated in FIG. 22, yttria powder at a desired ratio was firstly added to zirconia powder, mixed by dry process, and pulverized. Accordingly, mixed powder was obtained.

Next, the mixed powder and water were mixed to obtain a mixed powder slurry. For increasing fluidity of each of raw materials constituting the mixed powder to facilitate molding into a desired shape, the mixed powder slurry was granulated. The granulation is performed by, for example, spray granulation.

Next, the mixed powder was molded to obtain a molded body. The molding is performed by, for example, grain compaction molding. Grinding may be further performed. In the present example, the mixed powder was molded into the shape of a sample used in the later-described evaluation. In this molding step, the mixed powder can be molded into a desired shape such as the shape of the element in Embodiment 2.

Next, the molded body was fired at a temperature of 1400° C. In this manner, a fired body was obtained. Next, the fired body was subjected to an annealing treatment. The annealing treatment was performed by heating the fired body at a prescribed annealing temperature. In this manner, a solid electrolyte was obtained. In the present example, 13 types of solid electrolytes as samples 2 to 14 were prepared by changing the yttria content, the annealing temperature, and the retention time of the annealing temperature. It is noted that sample 1 is a solid electrolyte in which an annealing treatment is not performed. The production conditions of samples 1 to 14 are illustrated in Table 1. For the solid electrolytes of samples 1 to 14, the change rate of a crystallite diameter, the initial strength, the strength after endurance, and the strength reduction rate were measured as follows.

(Change Rate of Crystallite Diameter)

Figure 23:
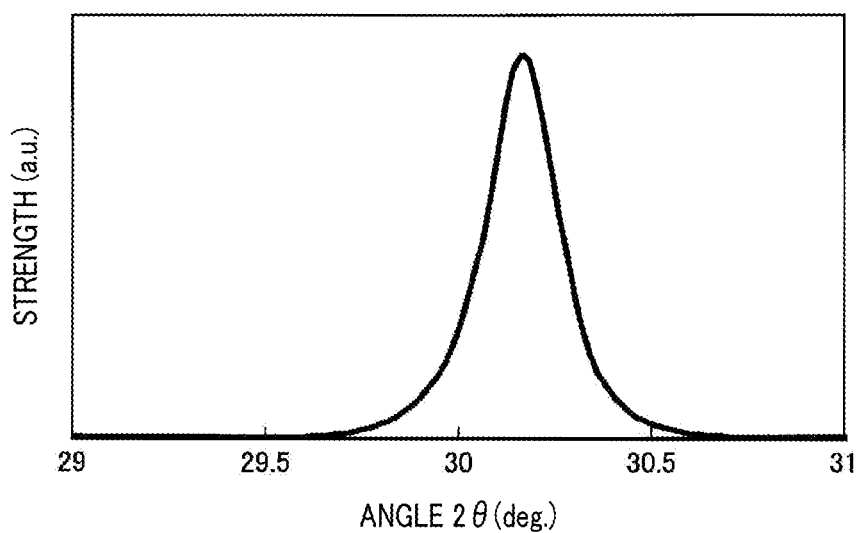
FIG. 23 is a diagram showing an example of a peak attributable to {111} of a C phase in an XRD pattern of a solid electrolyte, in Experimental Example 1.

The solid electrolytes of samples 1 to 14 were subjected to a cold-hot cycle of heating at a temperature increasing rate of 300° C./h from room temperature to 1200° C. and decreasing in temperature at a temperature decreasing rate of −300° C./h to room temperature. By X-ray diffraction (XRD), the change rate of a crystallite diameter for the C phase 21 before and after the cold-hot cycle was evaluated. For the evaluation, measurement was performed using an "Ultima III parallel goniometer (D/teX)" manufactured by Rigaku Corporation, by continuous scanning of 2θ/θ scan in the range of 2θ=29 to 31° with a sampling interval of 0.02°. The measurement was performed using Cu Kα rays as a radiation source at an accelerating voltage of 40 kV and a current of 30 mA. An example of the XRD pattern is shown in FIG. 23. A crystallite diameter D was calculated according to the following equation (I) as the Scherrer equation. It is noted that a crystallite diameter is calculated using a half width and a diffraction angle in an XRD pattern subjected to a smoothing treatment, as illustrated in FIG. 23. For the smoothing treatment, a "Peak Search" software manufactured by Rigaku Corporation was used. The treatment conditions are treatment: smoothing, weighted average: smoothing points 5 points, peak width threshold for BG removal: 0.1, and strength threshold: 0.01. It is noted that the "change rate of a crystallite diameter for the C phase" in the present example practically means "of the C phase and/or the T phase", from the viewpoint of the measurement principle of XRD analysis.

$$D = K \times \lambda / (\beta \times \cos \theta) \quad (I)$$

D: crystallite diameter, K: constant (K=0.9), λ: X ray wavelength (λ=1.5418 nm), β: half width, θ: diffraction angle (Initial Strength and Strength after Endurance)

The solid electrolytes of samples 1 to 14 were each cut into a width of about 5 mm, a length of 45 mm, and a thickness of 5 mm to obtained a measurement sample. For this measurement sample, a cold-hot cycle of heating at a temperature increasing rate of 300° C./h from room temperature to 1100° C. and decreasing in temperature at a temperature decreasing rate of −300° C./h to room temperature was repeated 1000 times. From the measurement sample subjected to no cold-hot cycle and the measurement sample subjected to 1000 cold-hot cycles, strength evaluation samples were prepared and subjected to a measurement of 4-point bending strength, in accordance with the 4-point bending test specified in JIS R 1601:2008. For the measurement of 4-point bending strength, 10 strength evaluation samples were prepared from each sample, and an arithmetic average result thereof was adopted. The 4-point bending strength of the sample subjected to no cold-hot cycle was defined as initial strength, and the 4-point bending strength of the sample subjected to 1000 cold-hot cycles was defined as strength after endurance.

(Strength Reduction Rate and Determination)

The reduction rate of the strength after endurance relative to the initial strength was defined as a strength reduction rate. The case of a strength reduction rate of 50% or more was determined as "C"; less than 50% and not less than 40% as "B"; and less than 40% as "A".

ments within the scope that does not depart from the gist of the present disclosure. For example, the solid electrolyte in Embodiment 1 can also be used for a fuel cell of a solid oxide fuel cell (SOFC). In this case, the solid electrolyte has contact surfaces with, for example, an anode layer and a cathode layer. Although not shown, the solid electrolyte can be applied to a single cell of a fuel cell in which an anode layer, an electrolyte layer containing a solid electrolyte, and a cathode layer are sequentially laminated. Furthermore, a plurality of single cells of a fuel cell can be laminated through separators to constitute a stack-type fuel cell. Also, examples of the gas sensor include, other than an air-fuel ratio sensor, an oxygen sensor and a NOx sensor. The solid electrolyte can also be applied to these sensors.

TABLE 1

| Sample No. | Annealing temperature (° C.) | Annealing temperature retention time (hour) | Yttria content (mol %) | Phase transition onset temperature (° C.) | Crystallite diameter change rate of C phase | Initial strength (MPa) | Strength after endurance (MPa) | Strength reduction rate | Determination |
|---|---|---|---|---|---|---|---|---|---|
| 1 | — | — | 6 | 900° C. | 13% | 350 | 150 | 57% | C |
| 2 | 800 | 0 | 6 | 900° C. | 12% | 350 | 190 | 54% | C |
| 3 | 800 | 0.5 | 6 | 910° C. | 11% | 360 | 190 | 52% | C |
| 4 | 800 | 0.75 | 6 | 915° C. | 10% | 370 | 200 | 46% | B |
| 5 | 800 | 1 | 6 | 930° C. | 9% | 360 | 200 | 44% | B |
| 6 | 800 | 2 | 6 | 930° C. | 9% | 360 | 200 | 44% | B |
| 7 | 900 | 1 | 6 | 945° C. | 7% | 360 | 250 | 36% | A |
| 8 | 950 | 1 | 6 | 960° C. | 4% | 350 | 260 | 29% | A |
| 9 | 1000 | 1 | 6 | 950° C. | 2% | 370 | 280 | 24% | A |
| 10 | 1100 | 1 | 6 | 935° C. | 6% | 360 | 240 | 28% | B |
| 11 | 1150 | 1 | 6 | 915° C. | 10% | 350 | 200 | 43% | B |
| 12 | 1200 | 1 | 6 | 900° C. | 12% | 360 | 170 | 53% | C |
| 13 | 950 | 1 | 4.5 | 955° C. | 10% | 370 | 210 | 43% | B |
| 14 | 950 | 1 | 8 | 960° C. | 2% | 260 | 200 | 23% | B |

Figure 24:
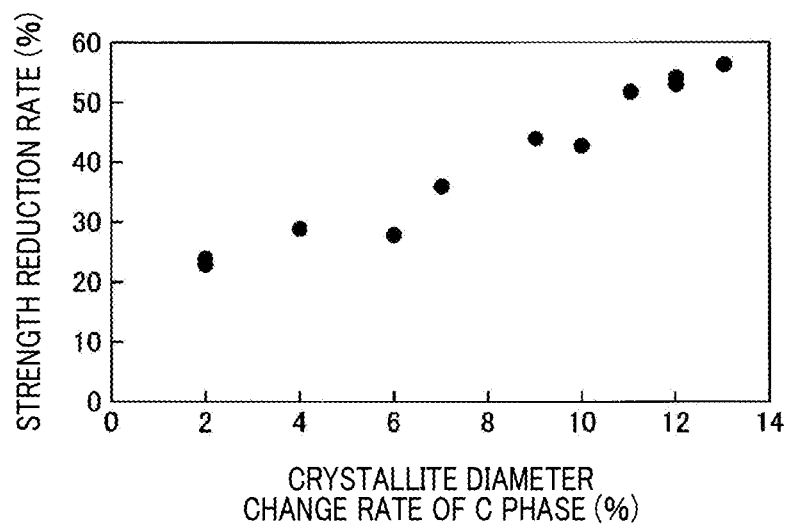
FIG. 24 is a diagram showing a relationship between a change rate of a crystallite diameter for a C phase and a strength reduction rate, in Experimental Example 1.

As understood from Table 1 and FIG. 24, when the change rate of a crystallite diameter is 10% or less, strength reduction rate is low. In brief, thermal shock resistance is excellent. From the viewpoint of further enhancing thermal shock resistance, the change rate of a crystallite diameter is more preferably 6% or less and further preferably 2% or less.

Figure 25:
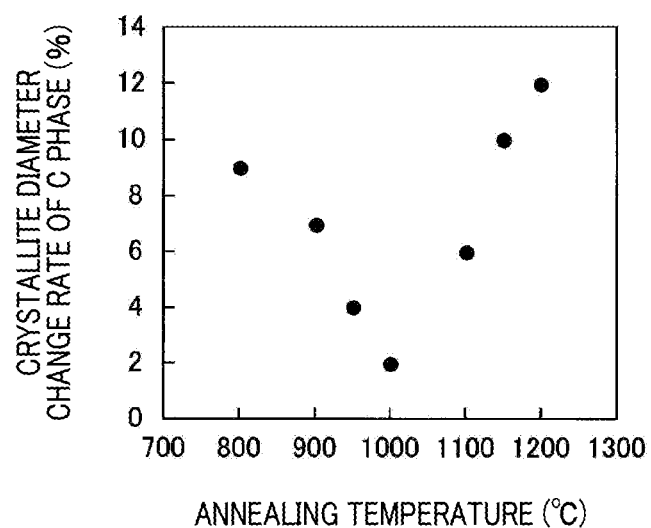
FIG. 25 is a diagram showing a relationship between an annealing temperature and a change rate of a crystallite diameter for a C phase, in Experimental Example 1.
Figure 26:
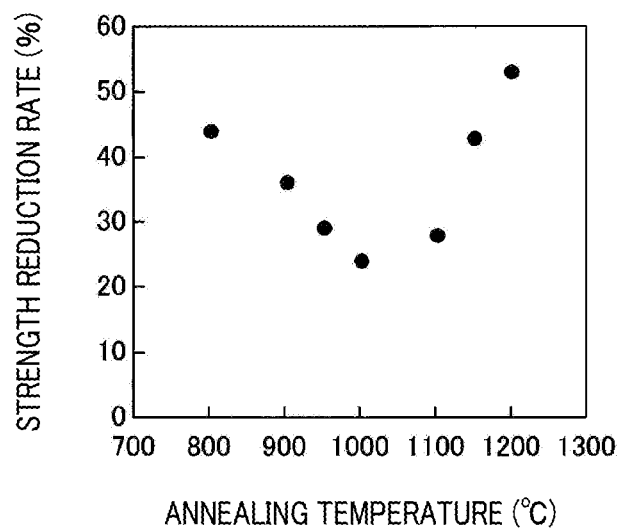
FIG. 26 is a diagram showing a relationship between an annealing temperature and a strength reduction rate, in Experimental Example 1.
Figure 27:
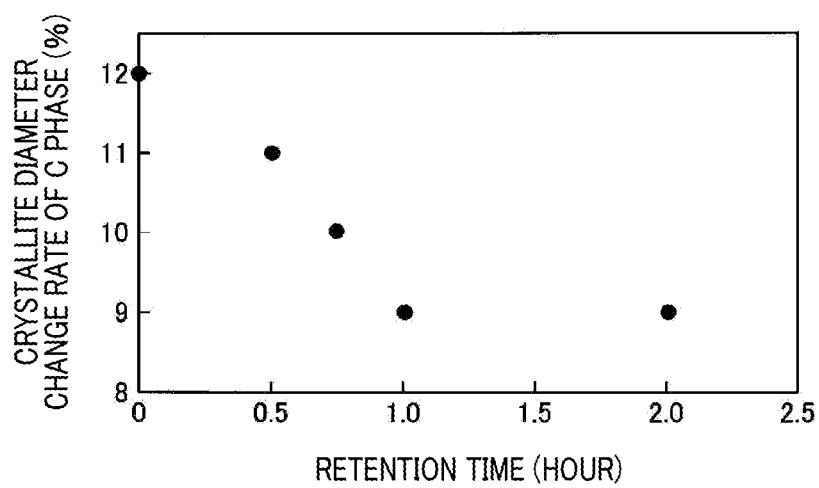
FIG. 27 is a diagram showing a relationship between a retention time of an annealing temperature and a change rate of a crystallite diameter for a C phase, in Experimental Example 1.

As understood from Table 1, FIG. 25, and FIG. 26, the annealing temperature is preferably 800 to 1150° C., more preferably 900 to 1100° C., and further preferably 950 to 1000° C., from the viewpoint of reducing the change rate of a crystallite diameter to sufficiently enhance thermal shock resistance. As understood from Table 1 and FIG. 27, the retention time at an annealing temperature is preferably 0.75 hour or more and more preferably 1 hour or more, from the viewpoint of sufficiently reducing the change rate of a crystallite diameter. On the other hand, the retention time at an annealing temperature is preferably 3 hours or less and more preferably 2 hours or less, from the viewpoint of shortening the retention time to enhance the productivity of the solid electrolyte.

The initial strength is preferably 350 MPa or more, because it is suitable for the solid electrolyte of the sensor element of the gas sensor. The strength after endurance is preferably 200 MPa or more, because it is suitable for the solid electrolyte of the laminated-type sensor element. The strength after endurance is more preferably 250 MPa or more, because it is suitable for the laminated-type sensor element and the cup-type sensor element. The strength reduction rate is preferably less than 50%, more preferably less than 40%, and further preferably 30% or less.

The present disclosure is not limited to the above-described embodiments, and can be applied to various embodiments within the scope that does not depart from the gist of the present disclosure. The present disclosure has been described in accordance with embodiments. However, it is understood that the present disclosure is not limited to the embodiments and configurations. The present disclosure also encompasses various variation examples or variations within the equivalent scope. In addition, various combinations and forms, and furthermore, other combinations and forms which include only one component, more than that, or less than that, in the various combinations or embodiments also fall within the category or conceptual scope of the present disclosure.

What is claimed is:

1. A solid electrolyte comprising partially stabilized zirconia,
   wherein:
   in the solid electrolyte, an yttria content of the partially stabilized zirconia is in a range of 4.5 mol % or more and 8 mol % or less; and
   a change rate of a crystallite diameter for a cubic phase in crystal particles constituting the solid electrolyte configured by a fired and annealed body produced after performing an annealing treatment, before heating from room temperature to 1200° C. and after cooling from 1200° ° C. to room temperature in a cold-hot cycle, is 4% or less, and the annealing treatment heats the fired body comprising the partially stabilized zirconia to produce the fired and annealed body.

2. A gas sensor comprising the solid electrolyte according to claim 1.

3. The solid electrolyte according to claim 1, wherein the solid electrolyte is constituted by a mixed phase of the cubic phase and a monoclinic phase.

4. The gas sensor according to claim 2, further comprising a sensor element that detects gas, wherein:
- the sensor element comprises the solid electrolyte, a detection electrode, and a reference electrode;
- the detection electrode and the reference electrode are respectively formed on both surfaces of the solid electrolyte; and
- the detection electrode and the reference electrode form a pair of electrodes which are formed in positions facing each other.

* * * * *